(12) United States Patent
Hasegawa et al.

(10) Patent No.: US 9,185,686 B2
(45) Date of Patent: Nov. 10, 2015

(54) MULTICHANNEL WIRELESS COMMUNICATION SYSTEM, BASE STATION, AND CHANNEL USING METHOD

(71) Applicant: HITACHI KOKUSAI ELECTRIC INC., Tokyo (JP)

(72) Inventors: Keigo Hasegawa, Tokyo (JP); Masayuki Takekawa, Tokyo (JP); Keat Beng Toh, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 13/738,072

(22) Filed: Jan. 10, 2013

(65) Prior Publication Data

US 2013/0183989 A1 Jul. 18, 2013

(30) Foreign Application Priority Data

Jan. 13, 2012 (JP) .................................. 2012-004783
Jun. 8, 2012 (JP) .................................. 2012-130682

(51) Int. Cl.
*H04W 72/04* (2009.01)
*H04W 16/04* (2009.01)
(Continued)

(52) U.S. Cl.
CPC .............. *H04W 72/04* (2013.01); *H04W 16/04* (2013.01); *H04W 16/14* (2013.01); *H04W 88/08* (2013.01)

(58) Field of Classification Search
CPC ..... H04W 16/10; H04W 16/14; H04W 16/02; H04W 16/04; H04W 16/12; H04W 16/06; H04W 16/24; H04W 92/20; H04W 24/02; H04W 36/06; H04W 72/0486; H04W 84/18; H04L 5/0037; H04L 5/0032; H04B 14/0077
USPC ........................... 455/446, 447, 450–455, 464
See application file for complete search history.

(56) References Cited

U.S. PATENT DOCUMENTS 5,673,259 A * 9/1997 Quick, Jr. ....................... 370/342
7,423,991 B2 * 9/2008 Cho et al. ...................... 370/329
(Continued)

FOREIGN PATENT DOCUMENTS

JP   2009-515468   4/2009

OTHER PUBLICATIONS

Habib et. al. (2003), an adaptive quality of service channel borrowing algorithm for cellular networks. Int. J. Commun. Syst., 16: 759-777.*
Fujji, Koji, "Cognitive radio: Core technology of using white space to eliminate the waste of wave use", [online], RIC TELECOM, [retrieved on Jun. 9, 2011], retrieved from http//businessnetwork.jp/tabid/65/artid/110/page/1/Default.aspx, (with English translation).
(Continued)

*Primary Examiner* — Brandon Miller
*Assistant Examiner* — Umair Ahsan
(74) *Attorney, Agent, or Firm* — Harness, Dickey & Pierce, PLC (57) ABSTRACT

A base station judges whether backup channel of the base station has therein a channel which is not an operating channel of another base station configuring an adjacent cell by the channel management unit, and, if there is at least one channel which is not an operating channel of the another base station, performs fairness processing according to a prescribed etiquette to have one of the channels as an operating channel of the base station, and, if not, determines a base station which requests a release of an operating channel from the another based on the basis of a degree of satisfaction defined as a function of an offered communication traffic within a cell, a transmission rate depending on a propagation environment between the base station and a wireless communication terminal and an actually allocated operating channel number, and performs negotiation processing to cause a release of an operating channel.

15 Claims, 8 Drawing Sheets

(51) Int. Cl.
*H04W 88/08* (2009.01)
*H04W 16/14* (2009.01)

(56) References Cited

U.S. PATENT DOCUMENTS

2008/0089389 A1* 4/2008 Hu ................................ 375/132
2008/0214199 A1* 9/2008 Ji ............................... 455/452.1
2009/0219944 A1 9/2009 Liang et al.

OTHER PUBLICATIONS

IEEE Standards Association, "Part 22: Cognitive Wireless RAN Medium Access Control (MAC) and Physical Layer (PHY) Specifications: Policies and Procedures for Operation in the TV Bands", IEEE Std 802.2-2011, Institute of Electrical and Electronics Engineers, Inc., New York, NY, Jul. 1, 2011.

* cited by examiner

MULTICHANNEL WIRELESS COMMUNICATION SYSTEM, BASE STATION, AND CHANNEL USING METHOD

BACKGROUND OF THE INVENTION

The present invention relates to a multichannel wireless communication technology according to which a base station uses two or more channels to configure a cell including wireless communication terminals, and more particularly to a technology for controlling the use of channels between neighbor base stations.

Progress of an information society in recent years is very remarkable, and as a communication method for many information and communications apparatus and services, wireless communication is also used frequently other than wire communication.

Therefore, the demands for the radio frequencies whose use is limited are increasing continuously, and the depletion of frequencies that can be allocated is posing a big problem in every country in the world. In general, a country performs license management of the frequencies, and only those who are licensed to use can use the frequencies in the specific location and time period.

But, in order to satisfy the demands for frequencies which will increase continuously in the future, a new method of using the frequencies not being obsessed with the incumbent use method is being demanded.

Therefore, as a new method of using the frequencies to solve the depletion problem of the frequencies, studies are being made in these years to provide a method using a frequency band (for white space) which is not used spatially and timewise though it has already been allocated.

For example, research and development are being performed on a cognitive wireless communication system or the like by which an unlicensed user (hereinafter referred to as "secondary user") uses the radio wave of the white space flexibly while the influence of the incumbent system for a licensed user (hereinafter referred to as "primary user") to the frequency use is avoided sufficiently. See the Non Patent Literature 1: Koji Fujii, "Cognitive radio: Core technology of using white space to eliminate the waste of wave use", RIC TELECOM, Retrieved on Jun. 9, 2011, on the Internet of businessnetwork.jp.

For example, in a wireless communication system using the white space, that is standardized by IEEE 802.22, respective radio stations access the database (DB) on an IP network by PAWS (Protocol to Access White Space database) to obtain a transmittable channel list (frequency list) based on the position information on a local station and maximum transmittable power. The transmittable channel list is collectively managed while it is being updated as required by a spectrum manager (SM) within a base station (BS). And, the BS determines a channel usable for communication as an operating channel according to the transmittable channel list and communicates with a wireless communication terminal (CPE: Customer Premises Equipment) such as a slave station, a cellular phone or the like, which is installed from door to door within a service area (cell) of the BS.

The SM manages spectrum sensing information. The respective radio stations (such as BS and CPE, the same applies below) are provided with a spectrum sensing function. Upon detecting by the spectrum sensing that the determined operating channel is being used by the incumbent system (system for the primary user), the respective radio stations notify the information to the SM. Then, the SM notifies the detected information to the DB and excludes the above channel from the transmittable channel list.

The wireless communication system using the white space performs dynamic spectrum access based on the information which is updated every moment as described above, avoids an influence to the frequency use by the primary user and also realizes communication of the secondary user.

Other functions provided to the SM include a function to share a list of operating channels (OPE) and a list of backup channels (BAK) with an adjacent BS, and according to such information, a channel can be selected exclusively not to cause interference between geographically closely positioned IEEE802.22 cells (adjacent cells). A Self Co-existence function (SC) is provided so that in a case where exclusive use is impossible, the channel is shared between the adjacent cells by time sharing. See the Non Patent Literature 2: "IEEE Std 802.22-2011 Part 22: Cognitive Wireless RAN Medium Access Control (MAC) and Physical Layer (PHY) Specifications: Policies and Procedures for Operation in the TV Bands" edited by Institute of Electrical and Electronics Engineers (IEEE) Computer Society, (U.S.A.), IEEE Standards Association, Jul. 27, 2011.

Figure 8:
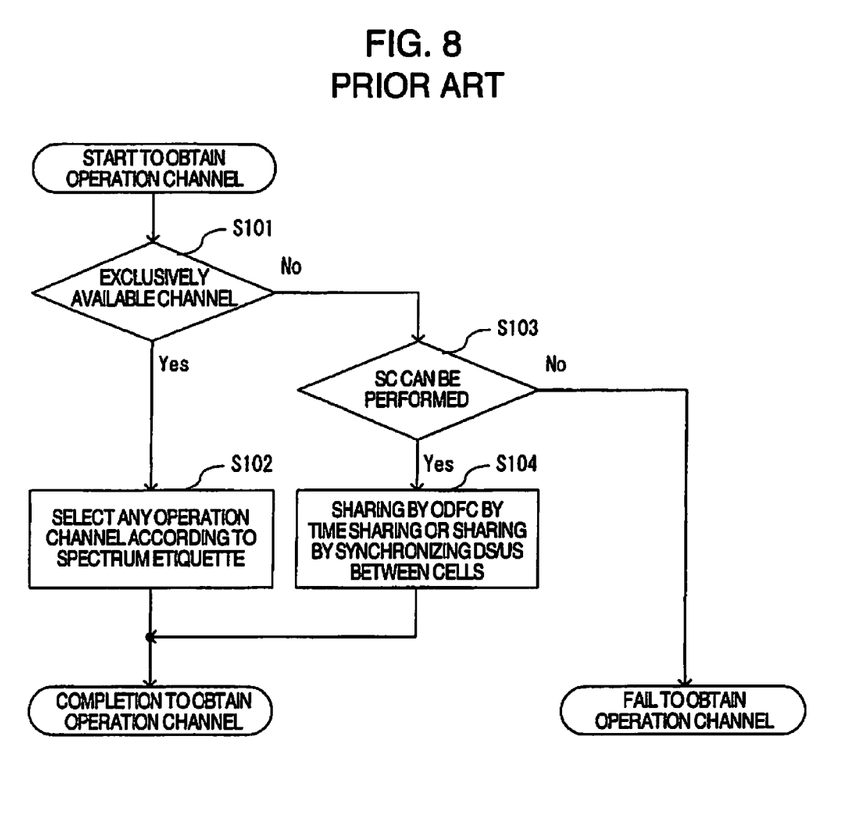
FIG. 8 is a diagram illustrating operating channel acquisition processing according to a conventional example.

FIG. 8 is a flow chart showing a flow to determine an operating channel after obtaining a list of channels usable by own cell and a channel list of all adjacent cells according to Non Patent Literatures.

Non Patent Literature 2 includes, for example, the following states as a state of channel.

AVA (Available): Channel notified as a usable white space by the DB.

OPE (Operation): Channel operating in the cell.

BAK (Backup): Operation candidate channel that is AVA and also judged as operable according to a sensing result.

LP1 (Local priority 1): Channel that is not OPE or BAK of an adjacent cell in the BAK.

LP2 (Local priority 2): Channel that is not OPE of an adjacent cell in the BAK.

LP3 (Local priority 3): OPE channel of an adjacent cell in the BAK.

Provided that an SCH (Superframe Control Header) or a CBP (Co-existence Beacon Protocol) is received from the adjacent cell, each BS can obtain a list of OPE and BAK channels of the adjacent cell. Then, a channel not causing interference between the adjacent cells is selected depending on the operating state of the channel of the adjacent cell.

The SCH is a frame header, which is transmitted at a top frame of the superframe having 16 frames as one control cycle, and includes an ID for uniquely identifying the BS and information on candidate channels for use.

The CBP is transmitted during a period called an SCW (Self Co-existence Window) allocated to the last of the uplink subframe, includes information on IDs and BAK channel numbers for uniquely identifying the BS similar to the SCH, and also includes information elements (IE), such as a frame release request (FC-REQ) for an ODFC (On-Demand Frame Contention) (FIG. 8, S104), a response (FC-RSP), a response acknowledgement (FC-ACK) and a release notification (FC-REL), which are used in a Self Co-existence mode.

First, the SM judges based on the operating channel information on the adjacent cell whether or not there is an exclusively available channel, namely a channel in a state of LP1 or LP2 (step S101).

And, when there are an exclusively available channel and LP1, a channel which is determined to be an OPE is selected out of the LP1, and when there is not LP1, a channel which is determined to be the OPE is selected out of the LP2 (step S102). In this case, a channel may also be selected according to the system specified standard, such as the order of priority of channel use, to determine its channel as an operating channel. For the order of priority, there is a way of following channel quality such as a CINR (Carrier power-to-Interference and Noise power Ratio), wireless communication regulation defined by the country, an operation rule for a network or a network operator's instruction.

On the other hand, when there is not an exclusively available channel, the SM judges whether or not the SC (Self Co-existence) mode can be performed (step S103).

When there is not LP3 or when the SC mode cannot be performed because of the wireless communication regulation defined by the country, the operation rule for a network or the network operator's instruction, the operating channel is not obtained, and BS operation is stopped, or waiting is made until an exclusively available channel becomes available.

When the SC mode can be performed, any channel is selected out of the LP3, and a channel operation right is obtained in a frame unit by randomized algorithm which is called as the ODFC from the OPE of the adjacent cell to realize channel sharing between cells by time sharing, or when interference can be avoided by synchronizing a downlink transmission/reception period (DS: Down Stream) and a uplink transmission/reception period (US: Up Stream) between cells, channel sharing is realized as a result.

The other prior art documents of the present invention is disclosed in Japanese Patent Application Publication No. 2009-515468.

SUMMARY OF THE INVENTION

The IEEE802.22 system provides the CPE with a wireless broadband communication system, and it is considered natural to use plural channels (multichannel) at the same time in order to provide a higher communication service.

However, it is not assumed that the operating channel determining unit of Non Patent Literature 2 use plural channels as the operating channels. Therefore, when the plural operating channels are to be obtained by the method of Non Patent Literature 2, a cell which has previously tried to obtain a channel occupies many channels. Therefore, a cell which is configured and managed by a later-activated BS, or a channel is later added to obtain according to traffic and the like, an exclusively operable channel is not remained already, and services among the cells become unfair.

The IEEE 802.22 system was described with reference to a specific example, but the same unfairness is caused in not only the IEEE 802.22 system, but also a cognitive radio communication system which is provided with the plural BSs configuring an area where the subscriber stations are included by using the plural channels.

The present invention has been made in view of the above circumstances and provides a multichannel wireless communication system provided with plural base stations (BSs) configuring cells including wireless communication terminals (CPEs) by utilizing plural channels respectively, in which plural channels are made fairly available among the cells to realize improvement of customer satisfaction (CS: Customer Satisfaction) of the respective cells.

The present invention also provides realization of efficient use of a white space with fairness in the multichannel wireless communication system.

A channel using method according to the present invention is a method performed by a base station configuring a cell including wireless communication terminals by using a plurality of channels, comprising judgment processing for judging whether or not there is a channel which is not an operating channel of another base station configuring a cell adjacent to the own cell within backup channels which can be used by the base station; fairness processing which, when there is at least one channel which is not the operating channel of the another base station, determines one of the channels as the operating channel of the base station according to a prescribed etiquette; and negotiation processing which, when there is no channel which is not the operating channel of the another base station, determines a base station to request a release of an operating channel from the another base station and makes the determined base station to release the operating channel based on a degree of satisfaction which is defined as a function of an offered communication traffic within the cell, a transmission rate depending on a propagation environment between the base station and the wireless communication terminals and an actually allocated operating channel number.

For example, in the system defining LP1, LP2 and LP3 as described above, it is judged whether there is a channel (that is, LP1 or LP2), which is not an operating channel (OPE) of another base station configuring a cell which is adjacent to the own cell, within backup channels (BAK) which can be used by the own base station, and when there is such a channel, that channel is determined as the own operating channel (OPE) as far as the spectrum etiquette allows, while when there is not such a channel (that is, LP3), a series of processing is repeated to make the another base station release an operating channel (OPE) by negotiation processing according to the degree of satisfaction.

According to the channel using method of the present invention, for example, when there is a channel which is not an operating channel of the another base station within the backup channels which can be used by the base station, the fairness processing further judges whether the channel is not a backup channel which can be used by the another base station; when it is not a backup channel of the another base station, determines the channel as the own operating channel; and when it is a backup channel of the another base station, determines the channel as the own operating channel based on the condition that the degree of satisfaction of the base station is smaller than the degree of satisfaction of the another base station or the degree of satisfaction of the another base station is invariable by repetition of a series of processing after the judgment processing.

That is to say, when the own base station is to OPE the channel in the BAK according to the above example, the above channel can be determined to be OPE in a case of LP1, and the balance of the degree of satisfaction is taken into consideration in a case of LP2, and the BAK of another base station is determined to be OPE of the own base station.

Therefore, the own base station can have a channel in the BAK put into OPE while keeping fairness with the base station of the adjacent cell.

According to the channel using method of the present invention, for example, the negotiation processing causes the another base station to release an operating channel based on the condition that the degree of satisfaction of the base station is minimum (smaller than or equal to the degree of satisfaction of any of other base stations) in comparison with the degree of satisfaction of the another base station or the degree of satisfaction of the another base station is invariable by the repetition of the series of processing after the judgment processing, and the degrees of satisfaction of both of them are not reversed when the another base station is caused to release the operating channel.

Specifically, according to the above case, when the own base station is to OPE a channel which is within BAK, LP3

(OPE of another base station) communication interference is caused when the channel is undergone OPE as it is. Therefore, the OPE of the other base station is released considering the balance of the degree of satisfaction, thereby making it possible to determine the above channel as OPE of the own base station.

Therefore, communication interference with the base station in the adjacent cell is not caused, and the own base station can have the channel within the BAK as OPE with fairness.

The multichannel wireless communication system according to the present invention is provided with a plurality of base stations configuring a cell including wireless communication terminals by using a single or plurality of channels, and a management device for managing information on a backup channel that can be used by each of the plurality of base stations, wherein the management device judges whether there is a channel, which is not operated by another base station configuring a cell adjacent to the cell of one base station, within the backup channels that can be used by the one base station, and when there is at least one channel not operated, determines the channel not operated as the own operating channel according to a prescribed etiquette, and when there is not a channel not operated, selects a base station that requests a release of an operating channel from the another base station on the basis of an offered communication traffic within the cell, a transmission rate depending on a propagation environment between the base station and the wireless communication terminals, and the degree of satisfaction which is determined as a function of the actually allocated operating channel number, and performs channel negotiation with the selected base station.

Here, the management device in the multichannel wireless communication system can be provided in the form of a server on the network where the respective base stations are controlled centrally or in the form where the respective base stations are provided with a function of the management device.

Therefore, this multichannel wireless communication system performs the channel using method according to the present invention.

The base station according to the present invention is a base station configuring a cell which includes wireless communication terminals by using a plurality of channels of a frequency of a white space, comprising channel management unit which judges whether there is a channel which is not operated by another base station configuring a cell which is adjacent to the cell of a base station within backup channels which are determined by spectrum sensing and can be used by the base station, and when there is at least one channel which is not operated, determines one of the channels as an operating channel of the base station according to a prescribed etiquette, and when there is not a channel which is not operated, determines a base station to request a release of an operating channel from the another base station on the basis of the degree of satisfaction calculated for each of the base station and the another base station as a function of an offered communication traffic within a cell, a transmission rate depending on a propagation environment between the base station and the wireless communication terminals, and an actually allocated operating channel number, and causes the determined base station to release the operating channel.

Therefore, this base station performs the channel using method according to the present invention.

According to the present invention, the multichannel wireless communication system using the white space makes fair channel use between cells possible and can provide a fair service in response to a band request by users who uses a wireless communication terminal.

Other objects, features, and advantages of the present invention will become apparent from the following description of embodiments of the present invention provided in relation to the accompanying drawings.

DESCRIPTION OF THE EMBODIMENTS

Embodiments of the present invention are described below with reference to the drawings.

In the respective drawings referred to in the following description, the same symbol is given to the same elements shown in other drawings.

<Outline of Multichannel Wireless Communication System>

Figure 1:
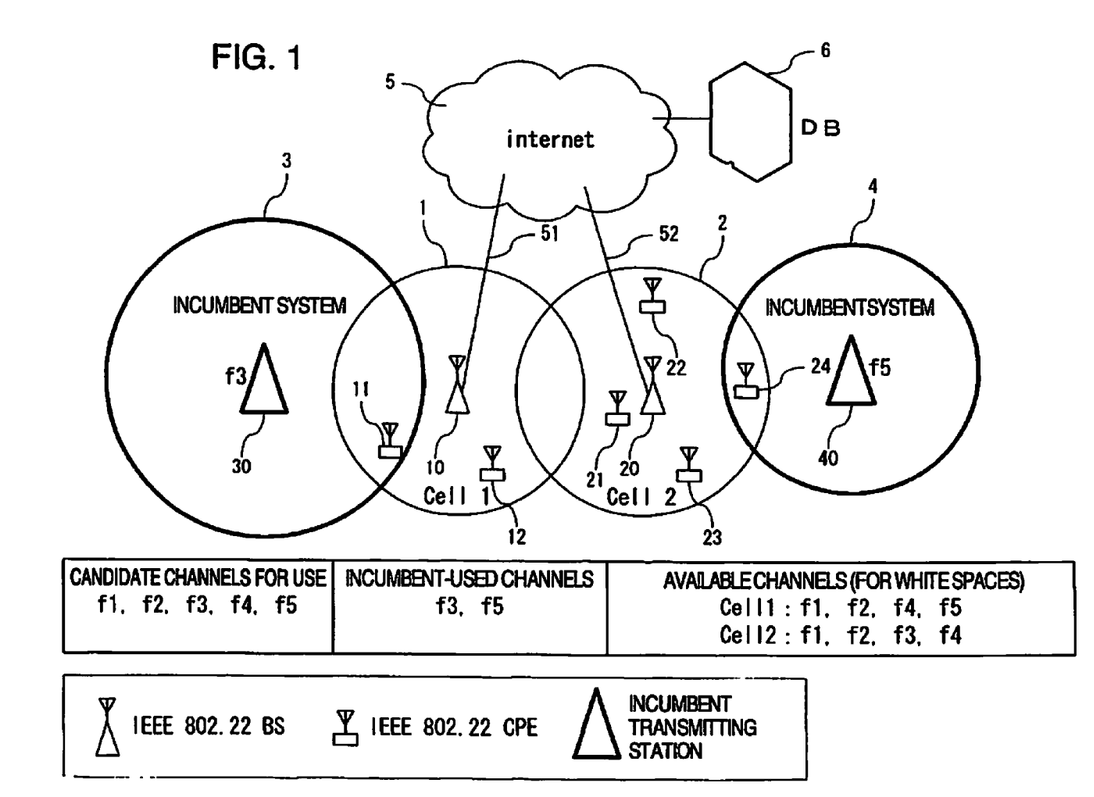
FIG. 1 is a configuration diagram of a multichannel wireless communication system according to an embodiment of the present invention.

FIG. 1 is a diagram showing an example of the whole structure of the multichannel wireless communication system according to this embodiment.

As shown in FIG. 1, the system of this example is composed of a cell 1, a cell 2, a backhaul link 51 of the cell 1, a backhaul link 52 of the cell 2, Internet 5, and a DB 6 of a management device which provides information on a white space. The management device provided with the DB 6, which manages information on exclusively used operating channels (OPEs) and the like allocated to respective base stations (BSs) configuring the respective cells as described later.

In the shown example, the cell 1 includes a CPE 11 and a CPE 12 which are wireless communication terminals, such as a slave station, a cellular phone and the like, which are installed from door to door and a BS 10 which is a base station to which the wireless communication terminals are connected, and a circle including the CPE 11, the CPE 12 and the BS 10 shows a service area of the BS 10, namely a range of the cell 1.

In the shown example, the cell 2 includes a CPE 21, a CPE 22, a CPE 23, a CPE 24 and a BS 20, and a circle including the CPE 21, the CPE 22, the CPE 23, the CPE 24 and the BS 20 shows a service area of the BS 20, namely a range of the cell 2.

For example, a wireless communication system (hereinafter called as "incumbent system") 3 for a primary user who is licensed to use a frequency from a country includes a transmitting station 30. And, a circle including the transmitting station 30 shows a service area of an incumbent system 3 and provides a service by using a licensed channel f3.

An incumbent system 4 includes a transmitting station 40. A circle including the transmitting station 40 shows a service area of the incumbent system 4 and provides a service by using a licensed channel f5.

As shown in FIG. 1, a service area of the cell 1 and a service area of the incumbent system 3 are geographically positioned close to each other and also overlapped partly, so that when the cell 1 has the channel f3 as an OPE channel, causes interference to the incumbent system 3. Therefore, the cell 1 cannot use the channel f3 as the white space.

The fact that the channel f3 cannot be used can be obtained when the BS 10 access the DB 6. When information of the DB 6 is old and inaccurate, and even if the channel f3 is notified as an AVA channel to the BS 10, the CPE 11 performs spectrum sensing, and as the detected result, detection information of the incumbent system 3 is notified to the BS 10, and unusability can be recognized.

The cell 1 recognizes the channels f1, f2, f4 and f5 as BAK channels by the above units. In addition, the OPE channel is determined from the above channels by using the SM so that customer satisfaction (CS) of each cell becomes fair as described later.

Similarly, since the incumbent system 4 exists in the neighborhood, the cell 2 accesses the DB 6 to recognize that AVA can use the channels f1, f2, f3 and f4 as the white spaces, and spectrum sensing by the CPE 24 checks that the incumbent system is not present, thereby recognizing that the above channels are BAK channels.

In this example, the customer satisfaction CS of each cell (each BS) is defined as expressed below (Expression 1a) or (Expression 1b).

$$CS = N_{OPE}/\text{Max}_{CPE}(W \times \lambda (R/N_{CPE})) \quad \text{(Expression 1a)}$$

$$CS = N_{OPE}/\Sigma_{CPE}(W \times \lambda/R) \quad \text{(Expression 1b)}$$

Here, the CS means that the degree of satisfaction within the cell is higher as its value is larger, $N_{OPE}$ denotes the number of operating channels (but, the channel of the SC mode is not included in this case) within the cell, $\lambda$ denotes an offered communication traffic of each CPE within the cell, R denotes a maximum transmission rate or communication channel capacity of each CPE that is determined depending on a distance between the BS and the CPE within the cell and a propagation environment, W denotes a weight of each CPE within the cell, $N_{CPE}$ denotes the number of CPEs within the cell, and $\Sigma_{CPE}$ denotes the total computation of all CPEs within the cell. When $N_{OPE}$ is 0, the CS also becomes 0.

The W has a value which is determined according to, for example, the subscriber's membership or the like, and a large value is allocated to subscribers of a high-price plan, municipalities, important infrastructures, such as plants.

When it is assumed that all channels have an equal transmission capacity R in the Expression 1a, $R/N_{CPE}$ shows transmission capacity per channel of each CPE when a communication opportunity is equally allocated to all CPEs within the cell, $\lambda(R/N_{CPE})$ shows a channel number required by the CPE, and when a maximum value of a necessary channel number to which a weight (W) is added is determined to be a necessary channel number within the cell, the CS value can also be understood as a value showing how many times of allowances the actually allocated channel number has with respect to the necessary channel number within the cell.

On the other hand, when it is assumed that other CPEs also have the same R as a CPE has, Expression 1b is also understood that for each CPE, a value, which shows how many times of margin all transmission capacities ($N_{OPE} \cdot R$. R denotes a rate per channel) of BS have with respect to the own traffic ($\lambda$), is added with a weight (W) added. The CS value is normally a monotonous increasing function of $N_{OPE}$ or R and a monotonous decreasing function of $N_{CPE}$ or $\lambda$. Since the R is always variable, the CS value may be a rough estimate value having an accuracy at a comparable level.

In this example, this CS value is determined as a reference value as described later, and for example, the cell which has judged that the CS value is relatively small when compared with the adjacent cell selects an OPE channel with priority, or performs negotiation to obtain the OPE channel.

<Specific Structure Example of Base Station (BS)>

Figure 2:
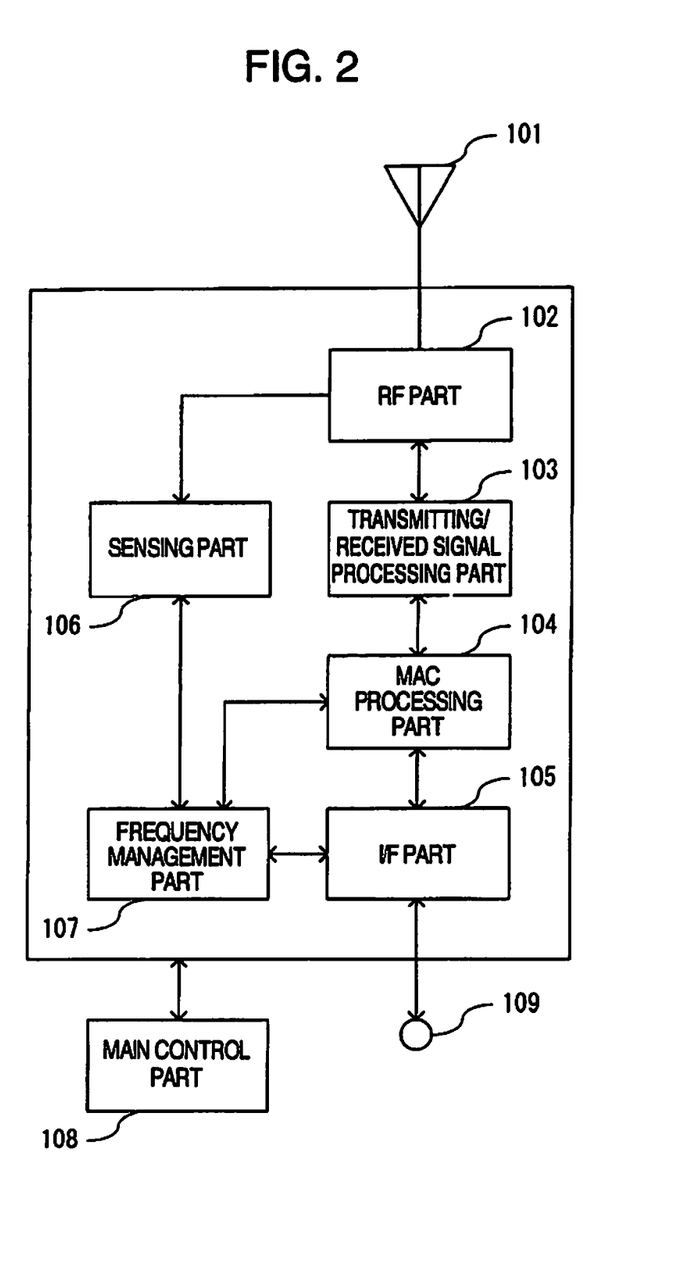
FIG. 2 is a configuration diagram of a base station (BS) according to the embodiment of the invention.

FIG. 2 shows a structure example of the BS which becomes the BS 10 or the BS 20.

The BS is provided with an antenna 101, an RF PART 102 which performs frequency conversion from a base band (BB) to radio frequency (RF) band, frequency conversion from radio frequency band to a base band, signal amplification, etc., a transmitting/received signal processing part 103 which performs error correction coding/decoding processing and modulation/demodulation processing, a MAC (Medium Access Control) processing part 104 which performs timing control of the used channel and transmission/reception, addition of an ID for identification of the wireless device to a packet and recognition of a transmission source wireless device, an I/F PART 105 which becomes interface with a backhaul link, a personal computer or a router, a sensing part 106 which performs signal processing of spectrum sensing to judge whether or not there is a wireless system that uses a channel, a frequency management part (SM) 107 which stores and manages a channel usable as a white space, a main control part 108 which performs management control of the whole wireless device, and a connection terminal 109 which is used to connect to a backhaul link, external equipment such as a personal computer and a router, and an external network.

The main control part 108 can be configured of, for example, a processor, a data storage area defined on a memory and software, and the transmitting/received signal processing part 103, the MAC processing part 104, the sensing part 106, and the frequency management part 107 can be replaced with a program executed by the main control part 108.

The frequency management part 107 includes functions to perform management of the operating state of a channel in the adjacent cell in addition to the storage and management of the available channel, and the determination processing of the OPE channel operated within the cell as shown in FIG. 2. According to the present invention, it is also provided with a channel negotiation function to make a channel release request and a response to a nearby BS.

That is to say, the frequency management part 107 configures a channel management unit that judges whether or not there is a channel, which is not an operating channel (OPE) of another base station configuring the cell adjacent to the own cell, within the backup channels (BAK) that can be used by the base station, and when there is a channel which is not an operating channel of the another base station, determines it as an operating channel (OPE) that is used exclusively by the base station according to the above-described customer satisfaction (CS).

<Specific Structure Example of Wireless Communication Terminal (CPE)>

Figure 3:
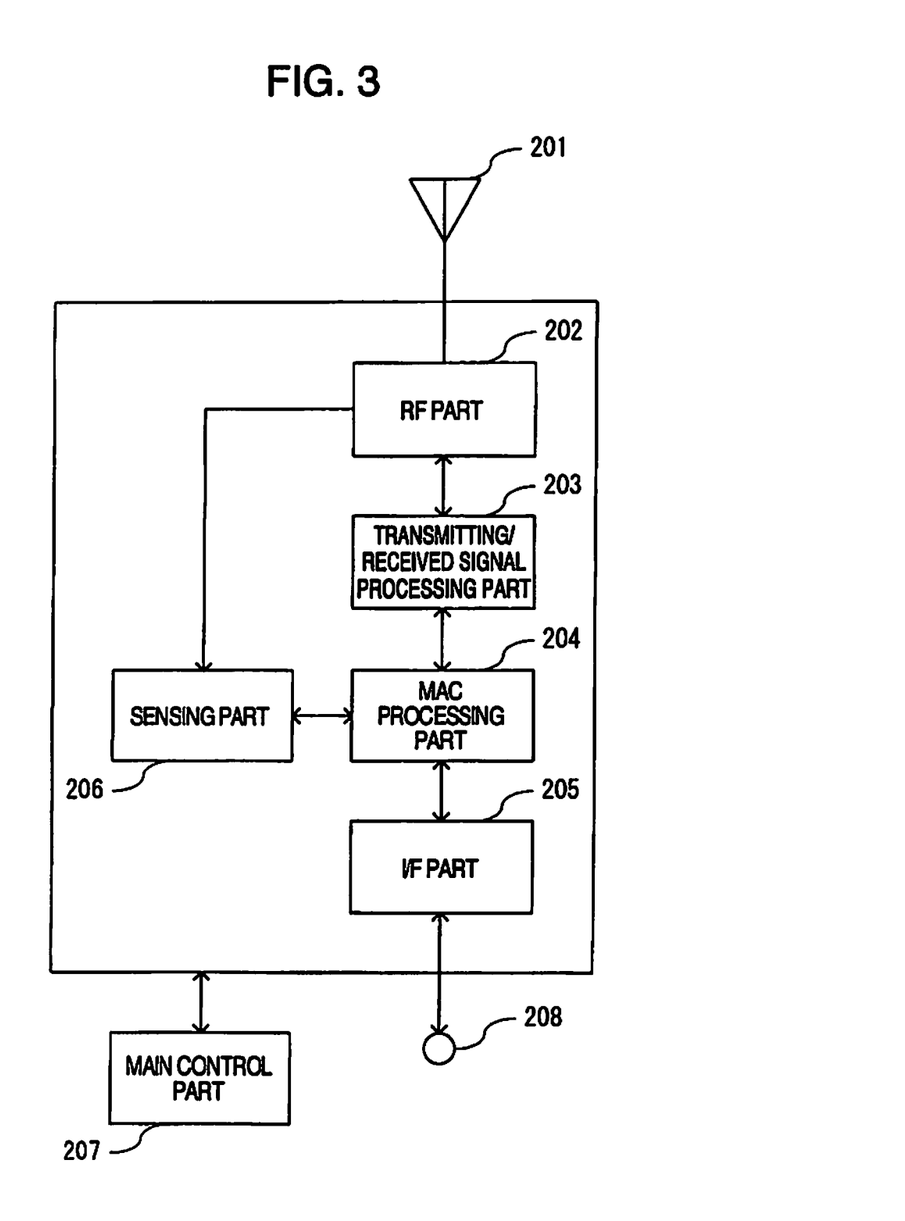
FIG. 3 is a configuration diagram of a wireless communication terminal (CPE) according to the embodiment of the invention.

FIG. 3 shows a structure example of CPE which becomes CPE 11, CPE 12, CPE 21, CPE 22, etc.

The CPE is provided with an antenna 201, an RF part 202 which performs frequency conversion from BB to RF band and frequency conversion from the RF band to the BB, signal amplification and the like, a transmitting/received signal processing part 203 which performs error correction coding/ decode processing and modulation/demodulation processing, a MAC processing part 204 which performs control of the used channel and transmitting and receiving timing, addition of ID for identification of a wireless device to the packet, and recognition of a wireless device which is a transmission source, an I/F PART 205 which becomes interface with a personal computer and a router, a sensing part 206 which performs signal processing of spectrum sensing to judge whether or not there is a wireless system using the channel, a main control part 207 which performs management control of the whole wireless device, and a connection terminal 208 which is used to connect to external equipment such as a personal computer and a router, and an external network.

The main control part 207 can be configured of, for example, a processor, a data storage area defined on a memory and software, and the transmitting/received signal processing part 203, the MAC processing part 204, and the sensing part 206 can be replaced with the program executed by the main control part 207.

<Operations of Multichannel Wireless Communication System>

Operation of the multichannel wireless communication system according to this embodiment is described below.

In this embodiment, it is assumed as an initial state that the frequency management part 107 included in each of BS 10 and BS 20 accesses the DB 6 on the IP network to obtain an available channel list. The BS 10 recognizes that the channels f1, f2, f4 and f5 are available (being BAK) within the cell 1 which is composed and managed by the base station, and the BS 20 recognizes that the channels f1, f2, f3 and f4 are BAK within the cell 2 which is composed and managed by the base station. And, it is determined that technique which is defined by the IEEE 802.22, namely, the frequency management part 107 which is included in each of the BS 10 and the BS 20 and receives SCH which is periodically transmitted by the BS of the adjacent cell and receives CBP which is transmitted by the BS or CPE of the adjacent cell recognizes the BAK channel and the OPE channel as the operating states of the channels in the adjacent cell.

In addition to the information element defined by IEEE 802.22, the CBP of this case includes, as a message used for a procedure by which the own BS operates the channel which is operated by the adjacent cell, information elements such as a channel release request (CN-REQ: Channel Negotiation Request), a response (CN-RSP: CN Response), a response acknowledgement (CN-ACK: CN Acknowledgement), a release notification (CN-REL: CN Release), OPE channel number ($N_{OPE}$), operating channel number, and a CS value.

Figure 4:
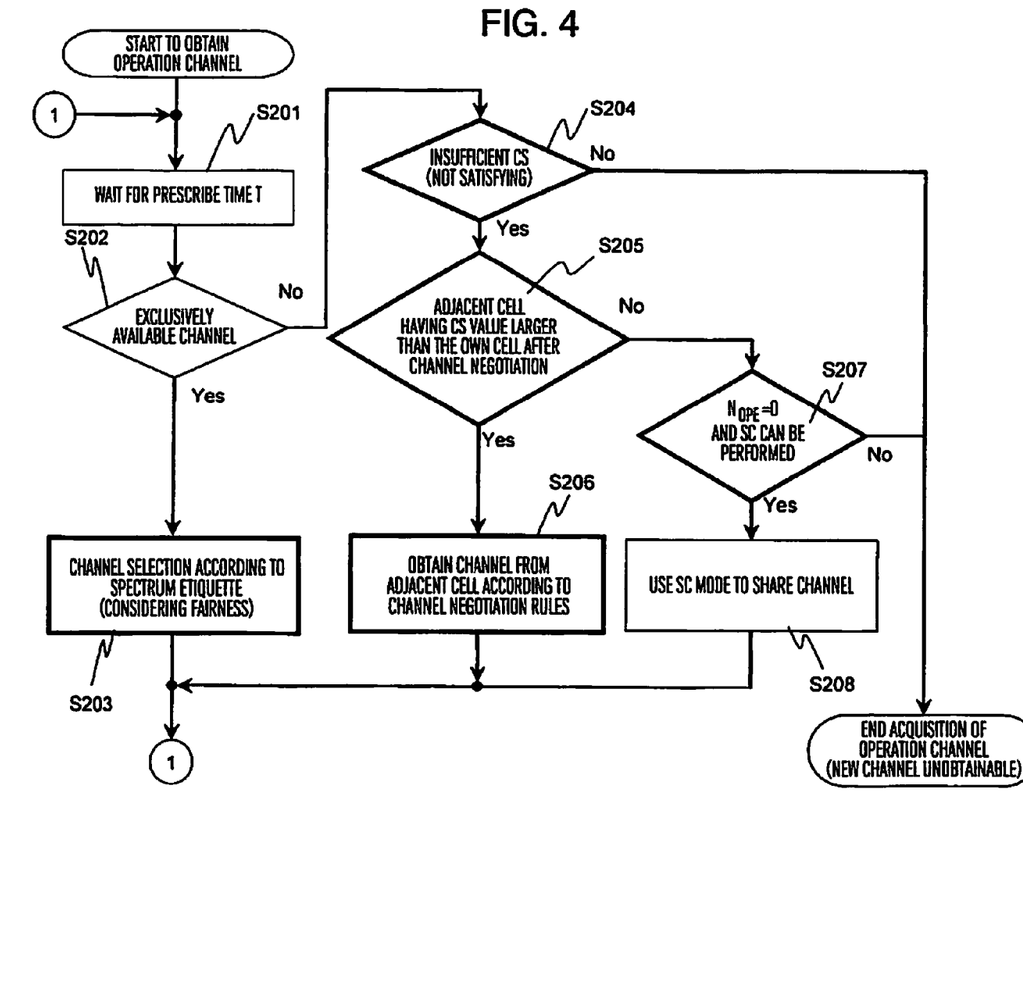
FIG. 4 is a diagram illustrating a channel determination processing according to the embodiment of the invention.

FIG. 4 is an OPE channel decision flow performed by each BS.

First, waiting is made for a system specified time period in order to collect a use situation of a channel in the adjacent cell (may be plural) (step S201). During the above, sensing or the like is also performed to check whether the incumbent system has not started to use newly the BAK channel.

The waiting time may take long when a CS value or an OPE channel number ($N_{OPE}$) is larger, and thus it is also possible to provide an order of priority among BSs which are to obtain the OPE channel.

After a lapse of the waiting time, it is judged whether or not the own backup channels (BAK) has therein a channel which is in a state of the exclusively available channel LP1 or LP2 (step S202).

As a judged result, when there is an exclusively available channel, channel selection processing is performed according to a spectrum etiquette considering fairness with reference to FIG. 5 as described later (step S203).

On the other hand, when there is no exclusively available channel, it is judged whether or not service quality within the own cell is satisfied (step S204). In this case, Expression 2 is used as for example a judgment index.

$$N_{sat} = \text{Countif}_{CPE}[N_{OPE}/N_{CPE} \times R > \alpha \lambda] \quad \text{(Expression 2)}$$

Here, $\text{Countif}_{CPE}[\ ]$ denotes a CPE number with which the conditional expression within the brackets [ ] agrees, $N_{OPE}$ denotes a CPE number within the cell, and α denotes a degree of allowance with respect to traffic λ which is determined depending on the membership. Similar to Expression 1, $N_{OPE}$ denotes operating channel number, and R denotes a maximum transmission rate of each CPE.

Therefore, $N_{sat}$ of Expression 2 denotes the number of CPEs which can satisfy a band request (traffic processing speed) when a band is allocated equally to all CPEs within the cell.

And, when $N_{sat} = N_{CPE}$, the acquisition of the OPE channel is terminated assuming that the CS within the cell was satisfied.

The index expressed by Expression 2 is only an example using the BS that allocates the band equally to all CPEs in the cell, and a conditional expression, when it is allocated according to the bandwidth allocation standard (algorithm) within the cell, should be a conditional expression to judge whether or not the CPE satisfies the band request.

Similar to the CS, the above index can also be an index showing the degree of satisfaction according to a ratio between necessary number of operating channels with respect to the offered communication traffic within the cell and actually allocated operating channel number, so that a method of providing a threshold value with respect to the CS value is deemed as a simple way.

When the judgment in the above step S204 is $N_{sat} < N_{CPE}$, it is judged whether or not there is an adjacent cell in which the CS value after the channel negotiation is larger than the own cell (step S205).

As a result, when there is an adjacent cell in which the CS value after the channel negotiation is larger than the own cell, channel negotiation processing is performed on the BS in the adjacent cell to make an OPE channel release request to the BS in the adjacent cell as described later with reference to FIG. 6 and FIG. 7, and depending on the negotiation result, additional acquisition of the OPE channel is performed (step S206).

As a judged result, when there is no adjacent cell in which the CS value after the channel negotiation is larger than the own cell, it is judged whether $N_{OPE} = 0$ and the SC mode (Self Co-existence mode) can be performed (step S207).

When the SC mode can be performed, the Self Co-existence defined by IEEE 802.22 is performed (step S208). Specifically, any channel is selected out of the LP3, and a channel operation right in a frame unit is obtained by randomized algorithm which is called as the ODFC to realize channel sharing between cells by time sharing, or when interference can be avoided by synchronizing a downlink transmission/reception period (DS: Down Stream) and an uplink transmission/reception period (US: Up Stream) between the cells, channel sharing is realized as a result.

In this case, according to the channel negotiation processing as described later, it is not always true that the adjacent cell releases a channel and it can be obtained as the own exclusively available channel. Therefore, when there is no own OPE channel, the processing sharing the channel with the adjacent cell in the SC mode is performed.

Figure 5:
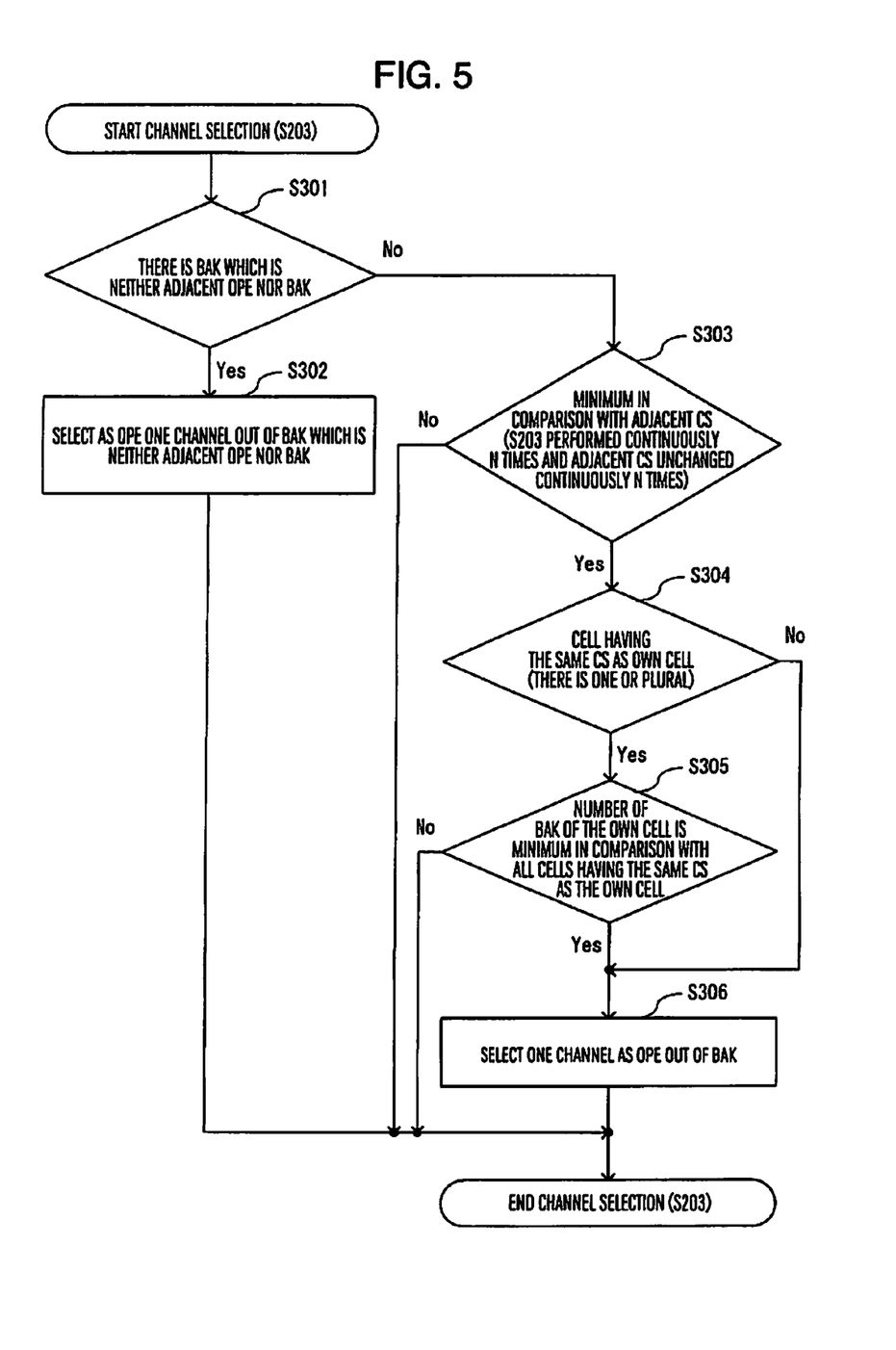
FIG. 5 is a diagram illustrating fairness processing according to the embodiment of the invention.

FIG. 5 is a flow chart showing in detail the operation of step S203 (fairness processing).

First, it is judged whether there is a channel LP1 that is not an OPE channel of the adjacent cell and not a BAK channel (step S301).

As a result, when there is LP1, the above channel is not used by the adjacent cell, so that one channel is selected as the own OPE channel out of the LP1 (step S302).

On the other hand, when there is not the LP1 (namely, there is LP2) as the above judged result, it is judged whether the CS value of the own BS value is minimum in comparison with the adjacent BS, or, in the operating channel acquisition process (FIG. 4), whether the CS value of the adjacent cell does not change when branching to step S203 is continued N times, and step S303 is performed every time (step S303).

The consecutive number of times N may be a system-defined constant for simplicity, but to select a channel fairly according to the order of the CS values in the adjacent cell, a technical way of having the CS values in ascending order (when the CS value is minimum, N=1) can also be used. Every time the above judgment is made, it is desirable that the CS value of each adjacent BS is updated by the value obtained in step S201 or the like, but when it is difficult, the latest CS value at that time or the minimum value (worst value) of the plurality of CS values obtained in the past can be used.

When it is judged Yes in step S303, it is judged whether or not there is a cell having the same CS value as the own cell (step S304), and when it is judged No, the fairness processing (step S203) is terminated.

Then, when it is judged that there is a cell having the same CS value as the own cell (namely, there are plural minimum values in S303, and one of them is CS of the own cell), it is judged whether the BAK channel number of the own cell is minimum in comparison with the cell having the same CS value as the own cell (step S305).

When there is not a cell having the same CS value as the own cell (step S304) and when the BAK channel number is minimum in comparison with the cell having the same CS value (step S305), any one channel is selected as an OPE channel out of the BAK channels (step S306).

On the other hand, when it is judged No in step S305, a new OPE channel is not selected this time.

That is to say, in the above-described fairness processing, OPE channel is selected for LP1 from the own BAK channel, and the OPE channel of the own cell is selected for LP2 according to a balance of the CS with the adjacent cell and a balance of the BAK channel number, so that the balances do not become unfair.

In the fairness processing of FIG. 5, steps S303 to S305 may be omitted partly.

Figure 6:
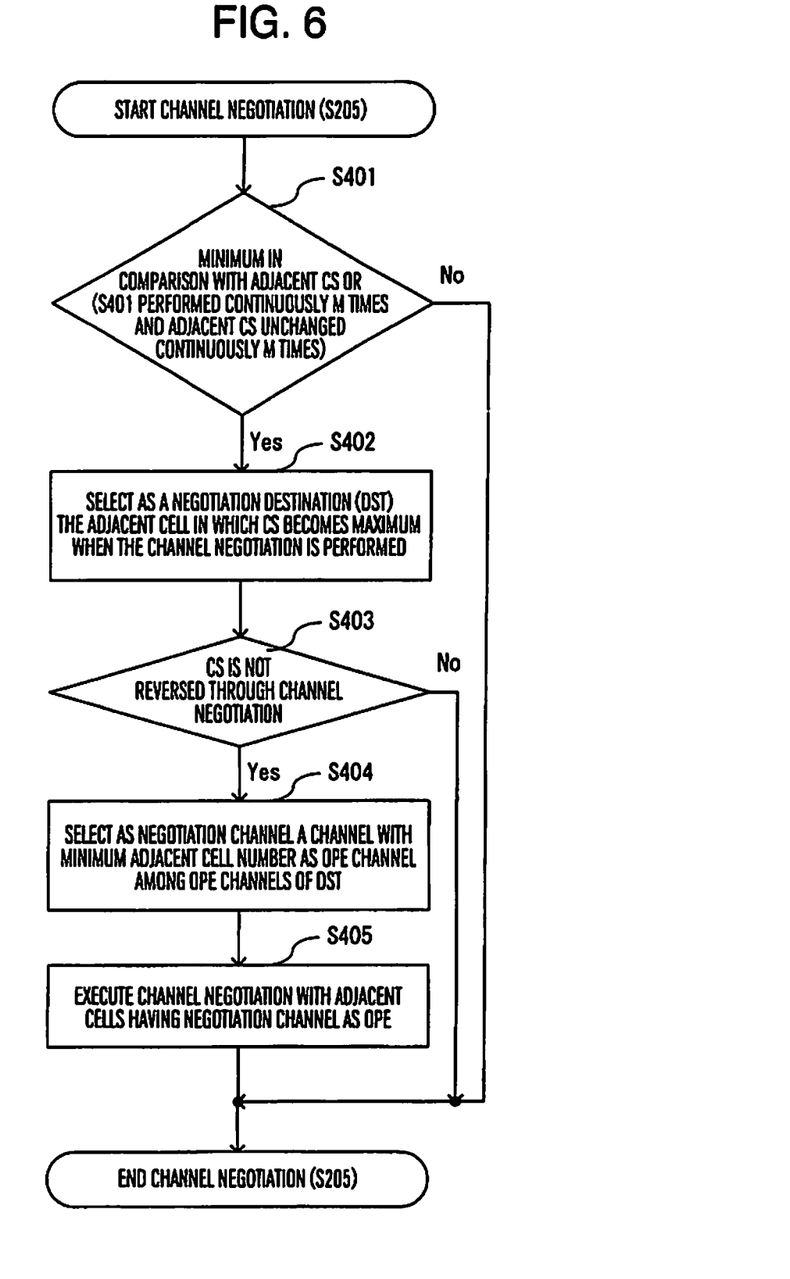
FIG. 6 is a diagram illustrating negotiation processing according to the embodiment of the invention.

FIG. 6 is a flow chart showing in detail the operation of step S206 (negotiation processing).

First, it is judged whether the CS value of the own BS is minimum in comparison with the BS of the adjacent cell, or it is judged whether the step S206 is performed continuously M times in the operating channel acquisition process (FIG. 4) and the CS value of the adjacent cell does not change during that period (step S401).

The consecutive number of times M may be a system-defined constant for simplicity, but to perform channel negotiation fairly and efficiently according to the order of CS values in the adjacent cell, it may be determined to have a technical way of having the CS values in ascending order (when the CS value is minimum, M=1).

When it is judged Yes in step S401, the adjacent cell, in which the CS value becomes maximum when the channel negotiation is performed, is selected as a negotiation destination (DST) (step S402).

When the channel negotiation is performed, the CS value ($CS_{DST}$) of the DST after the negotiation can be calculated by Expression 3 according to the operating channel number and the CS value of the current DST.

$$CS_{DST} = CS \times (N_{OPE}-1)/N_{OPE} \quad \text{(Expression 3)}$$

It is then judged whether or not the CS value is reversed through channel negotiation with the DST (step S403).

For example, when the DST operates only one channel, it is determined not to perform the channel negotiation ($CS_{DST}$ becomes 0 in such a DST. And $CS_{DST}$ of the own cell has a value larger than 0 though λ and R are unknown). And, it is to avoid mutual scrambling for the channel (to repeat negotiation).

When the CS value is not reversed through the channel negotiation with the DST, one is selected as a negotiation channel from channels whose number operated by the cell adjacent to the own BS is the least in the OPE channel of the selected DST (step S404).

Then, all adjacent cells operating the negotiation channel is determined as DST, channel negotiation is executed to all adjacent cells to obtain the OPE channel of the own cell (step S405).

When it is judged No in step S401 or S403, the negotiation processing is terminated.

That is to say, in the negotiation processing, the OPE channel of the own cell is selected according to the balance of the CS with the adjacent cell, so that the balances do not become unfair.

Figure 7:
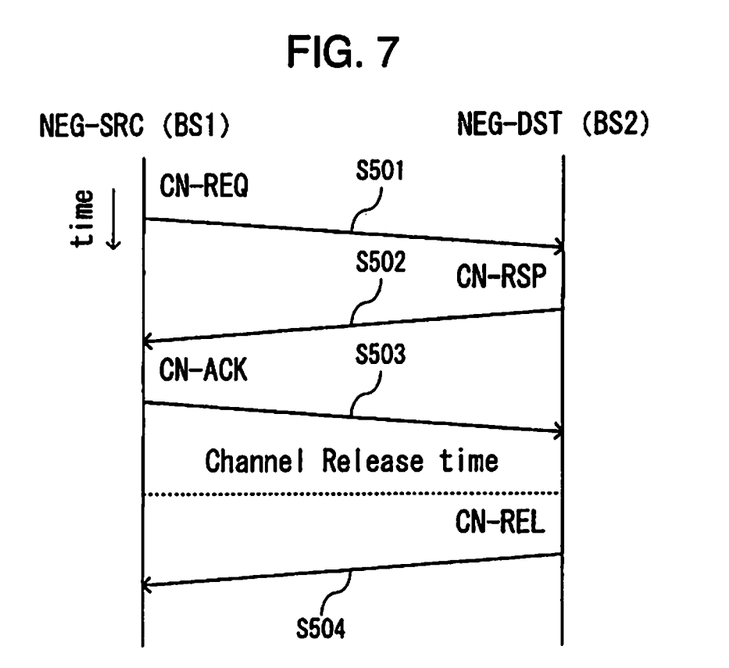
FIG. 7 is a diagram illustrating negotiation processing according to the embodiment of the invention.

FIG. 7 is a sequence view showing in detail the operation of step S405, in which it is shown that BS1 is a negotiation source (SRC), and BS2 is a negotiation destination (DST).

First, the SRC transmits a channel negotiation request (CN-REQ) which is an information element of the CBP in step S501. The CN-REQ includes an ID for identifying that the information element is CN-REQ, an ID of the DST (BS2) which is a negotiation destination, a CS value of the present SRC (BS1), a CS value after the establishment of negotiation, an operating channel number, and a negotiation channel number.

Then, the DST (BS2) which has received the CN-REQ in step S502 transmits back a channel negotiation response (CN-RSP) which is an information element of the CBP to the SRC (BS1).

The CN-RSP includes an ID for identifying that the information element is CN-RSP, an ID of the SRC (BS1) which is a negotiation source, a CS value of the present DST (BS2), a CS value after the establishment of negotiation, an operating channel number, a channel number (negotiation channel number) to be released, a channel release time, etc.

In step S503, the SRC (BS1) transmits, to the DST(BS2), a channel negotiation response acknowledgement (CN-ACK) which is an information element of the CBP after receiving the CN-RSP from all DSTs.

The CN-ACK includes an ID for identifying that the information element is CN-ACK, an ID of the SRC (BS1) which is a negotiation source, a CS value of the present DST (BS2), a CS value after the establishment of negotiation, an operating channel number, a channel number (negotiation channel number) to be released, a channel release time, etc.

In step S504, DST transmits a channel release (CN-REL) which is an information element of the CBP in order to notify to the adjacent cell of the SRC and the DST that the release of the channel after a lapse of channel release time is performed within one superframe defined in IEEE802.22.

The CN-REL includes an ID for identifying that the information element is the CN-RSP, an ID of the SRC (BS1) which is a negotiation source, a CS value after the channel release, an operating channel number, a channel number (negotiation channel number) to be released, etc.

As described above, the present invention enables fair use of the plural channels between the cells in the IEEE802.22 system, and can realize the improvement of the customer satisfaction (CS) of each cell.

The above-described CS value is merely an example, and it is determined, for example, $CS=N_{OPE}$, and the present invention can use various indexes showing an operating channel number which is actually allocated for necessity of the operating channel within the cell.

In the above embodiment, it was assumed for simplicity that transmission capacities R of all channels (also including a channel which is to be obtained through the channel negotiation) are equal. But, actually, since maximum transmittable power of the actually allocated operating channel, interference from another system or the like and a state of a transmission path are different among the respective channels, the expression using the transmission capacity of each channel may be determined as $CS=N_{OPE}/Max_{CPE}(W \times \lambda/(\Sigma_{OPE}(R)/N_{CPE}))$. In the expression, $\Sigma_{OPE}$ denotes a total of the actually allocated operating channels. The judgment index indicating whether the service quality within the cell has been satisfied may also be determined to be $N_{sat}=Countif_{CPE}[(\Sigma_{OPE} \times R/N_{CPE}) > \alpha\lambda]$.

The scope of the present invention is not limited to the implementation according to the direct wireless communication between the BSs shown in the above example. MAC message including the above-described information element may be capsulated and communicated through a backhaul link or the like. And, processing in FIG. 5 or FIG. 6 performed by the SM of the base station may be realized by centralized control by a server, a network manager or the like disposed on the Internet. For example, the operating state of the channel of each BS may be monitored and controlled by the server or the like, and even if each BS requests the server for a channel, or even if the server instructs the BS to release the channel, an effect equivalent to the object of the present invention can be brought about.

The present invention is suitable for a system that can be used for a cognitive wireless system that uses commonly plural frequency resources among plural stations (base stations), and provides especially a best-effort type of service to plural users.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A channel using method performed by a base station configuring a cell including wireless communication terminals by using a plurality of channels of white space, comprising:
   a judgment process judging whether or not there is an exclusively-available channel which is not an operating channel of adjacent base stations within backup channels usable by the base station;
   a fairness process which, when there is at least one exclusively-available channel in the judgment process, determines the one exclusively-available channel as a new operating channel of the base station, wherein the fairness process comprises:
   a first judging step judges whether there is at least one channel which is neither an operating channel nor backup channel of the adjacent base stations among the backup channels of the base station;
   when there is at least one channel which is neither an operating channel nor backup channel of the adjacent base stations,
      a first selecting step selects the one channel of the first judging step as the new operating channel; and
   when there is not at least one channel which is neither an operating channel nor backup channel of the adjacent base stations,
      a second judging step judges whether the satisfaction degree of the base station is minimum among the adjacent base stations;
      a third judging step judges whether there is a second cell that has a satisfaction degree that is the same as the satisfaction degree of the cell having the base station when the second judging step determines that the satisfaction degree of the base station is minimum among the adjacent base stations;
      a fourth judging step judging whether the second cell has a greater number of back up channels than the cell of the base station when the third judging step determines that there is the second cell that has the satisfaction degree that is the same as the satisfaction degree of the cell having the base station; and
      a second selecting step selects any one of the backup channels of the base station as the new operating channel for exclusive use when the satisfaction degree of the base station has been judged minimum in the second judging step and the cell of the base station has a fewer number of the backup channels in comparison with the second cell that has the satisfaction degree that is the same as the cell having the base station as judged in the third and the fourth judging steps; and
   a negotiation process which, when there is no channel which is not the operating channel of the adjacent base stations, determines within the adjacent base stations using plural operating channels a certain base station to request a release of a certain operating channel based on a comparison of satisfaction degrees between the base station and the certain base station and causes the certain base station to completely release the certain operating channel,
   wherein each of the satisfaction degree is defined as a same mathematical function of communication traffic within the cell, a transmission rate depending on a propagation environment between the base station and the wireless communication terminals and a number of actually allocated operating channels of white space,
   wherein in the negotiation process, the base station and the certain base station exchange information of their satisfaction degree with each other using a medium access control message or under control of a centralized server, and
   wherein the negotiation process causes at least one of the adjacent base stations to completely release an operating channel on condition that the satisfaction degree of the base station is minimum in comparison with the satisfaction degree of the adjacent base station or the satisfaction degree of the adjacent base station is invariable while repeating the series of processes after the judgment process, and the satisfaction degree of both of them are not reversed even when the adjacent base station releases the operating channel.

2. The channel using method according to claim 1, wherein the negotiation process comprises:
   a judging step judges whether the satisfaction degree of the base station is minimum compared to the adjacent base stations;

a destination selecting step selecting a most satisfied base station of which satisfaction degree after losing its any one operating channel is maximum among the adjacent base stations;

a channel selecting step selecting the certain operating channel of the most satisfied base station, which is used by least number of the adjacent base stations;

an executing step negotiating each of the certain base station using the certain operating channel to obtain the certain operating channel.

3. The channel using method according to claim 2, the satisfaction degree of a targeted base station is calculated by:

$$CS=NOPE/MaxCPE(W\times\lambda/(R/NCPE))$$

or $$CS=NOPE/\Sigma CPE(W\times\lambda/R)$$

where CS represents the satisfaction degree, NOPE represents the number of actually allocated operating channel of targeted base station, NCPE denotes the number of the wireless communication terminals in the cell of the targeted base station, W denotes a weight of each the wireless communication terminal depending on subscriber's membership, $\lambda$ denotes communication traffic of each the terminal, R denotes transmission capacity per channel of each the terminal depending on its distance from the targeted base station, and $\Sigma CPE$ denotes total computation of all wireless communication terminals in the cell.

4. The channel using method according to claim 2, further comprising:
a self judgment process judging whether or not service quality in the cell of the base station is enough to avoid the negotiation process by estimating a number of satisfied wireless communication terminals in the cell, wherein the satisfaction of each wireless communication terminal depends on subscriber's membership.

5. The channel using method according to claim 2, further comprising:
a waiting process waiting a specified time period before the judgment process in order to collect a status of channel usage in the adjacent base stations by receiving signals of super frame header or coexistence beaconing protocol.

6. The channel using method according to claim 5, wherein:
in the waiting process, the specified time period increases with increase of the satisfaction degree or the number of actually allocated operating channel of the base station for the purpose of providing an order of priority to obtain an operating channel.

7. The channel using method according to claim 2, wherein:
in the executing step, the base station and the certain base station exchange information of their satisfaction degrees with each other using a medium access control message or under control of the centralized server.

8. The channel using method according to claim 2, wherein the satisfaction degree of a targeted base station is calculated by:

$$CS=NOPE/MaxCPE(W\times\lambda/(R/NCPE))$$

or $$CS=NOPE/\Sigma CPE(W\times\lambda/R)$$

where CS represents the satisfaction degree, NOPE represents the number of actually allocated operating channel of targeted base station, NCPE denotes the number of the wireless communication terminals in the cell of the targeted base station, W denotes a weight of each the wireless communication terminal depending on subscriber's membership, $\lambda$ denotes communication traffic of each the terminal, R denotes transmission capacity per channel of each the terminal depending on its distance from the targeted base station, and $\Sigma CPE$ denotes total computation of all wireless communication terminals in the cell, wherein in the negotiation process, the base station and the certain base station exchange information of their satisfaction degrees with each other using the medium access control message or under control of the centralized server, and wherein in the executing step, the base station and the certain base station exchange information of their satisfaction degrees with each other using the medium access control message or under control of the centralized server.

9. The channel using method according to claim 1, the negotiation process comprising the steps of:
transmitting a medium access control message of a channel negotiation request from the base station as a negotiation source to the certain base station as a negotiation destination, wherein the medium access control message of the channel negotiation request includes an ID identifying the channel negotiation request, an ID of the negotiation destination, the satisfaction degree of the negotiation source, the satisfaction degree after establishment of negotiation and a negotiation channel number;

transmitting a medium access control message of a channel negotiation response from the negotiation destination which has received the channel negotiation request to the negotiation source, the medium access control message of the channel negotiation response includes an ID identifying the channel negotiation response, an ID of the negotiation source, the satisfaction degree of the negotiation destination, the satisfaction degree after the establishment of negotiation, a channel number to be released, and a channel release time;

transmitting a medium access control message of a channel negotiation response acknowledgement from the negotiation source to the negotiation destination; and transmitting a medium access control message of a channel release from the negotiation destination to the negotiation source to notify the negotiation source and any cell adjacent to the negotiation destination.

10. The channel using method according to claim 2, the negotiation process comprising the steps of:
transmitting a medium access control message of a channel negotiation request from the base station as a negotiation source to the certain base station as a negotiation destination, wherein the medium access control message of the channel negotiation request includes an ID identifying the channel negotiation request, an ID of the negotiation destination, the satisfaction degree of the negotiation source, the satisfaction degree after establishment of negotiation and a negotiation channel number;

transmitting a medium access control message of a channel negotiation response from the negotiation destination which has received the channel negotiation request to the negotiation source, the medium access control message of the channel negotiation response includes an ID identifying the channel negotiation response, an ID of the negotiation source, the satisfaction degree of the negotiation destination, the satisfaction degree after the establishment of negotiation, a channel number to be released, and a channel release time;

transmitting a medium access control message of a channel negotiation response acknowledgement from the negotiation source to the negotiation destination; and transmitting a medium access control message of a channel release from the negotiation destination to the negotiation source to notify the negotiation source and any cell adjacent to the negotiation destination.

11. The channel using method according to claim 1, wherein the satisfaction degree decreases with an increase in a number of the wireless communication terminals.

12. A multichannel wireless communication system, comprising:
a plurality of base stations configuring a cell including wireless communication terminals by using a single or plurality of channels of white space; and
a management device managing information on a backup channel usable by each of the plurality of base stations;
wherein the management device judges, for one base station, whether there is an exclusively-available channel not operated by adjacent base stations which are adjacent to the one base station, within the backup channels usable by the one base station, and
when there is at least one exclusively-available channel judged in the management device, the management device determines the one exclusively-available channel as a new operating channel of the base station, according to a fairness process, wherein the fairness process includes:
a first judging step judges whether there is at least one channel which is neither an operating channel nor backup channel of the adjacent base stations among the backup channels of the base station;
when there is at least one channel which is neither an operating channel nor backup channel of the adjacent base stations,
a first selecting step selects the one channel of the first judging step as the new operating channel; and
when there is not at least one channel which is neither an operating channel nor backup channel of the adjacent base stations,
a second judging step judges whether the satisfaction degree of the base station is minimum among the adjacent base stations;
a third judging step judges whether there is a second cell that has a satisfaction degree that is the same as the satisfaction degree of the cell having the base station when the second judging step determines that the satisfaction degree of the base station is minimum among the adjacent base stations;
a fourth judging step judging whether the second cell has a greater number of back up channels than the cell of the base station when the third judging step determines that there is the second cell that has the satisfaction degree that is the same as the satisfaction degree of the cell having the base station; and
a second selecting step selects any one of the backup channels of the base station as the new operating channel for exclusive use when the satisfaction degree of the base station has been judged minimum in the second judging step and the cell of the base station has a fewer number of the backup channels in comparison with the second cell that has the satisfaction degree that is the same as the cell having the base station as judged in the third and the fourth judging steps;

when there is no exclusively-available channel not operated, the management device selects a certain base station to which a request is made for complete release of a certain operating channel based on a comparison of satisfaction degrees between the one base station and the certain base station wherein each of the satisfaction degree is determined as a same mathematical function of communication traffic within the cell depending on a propagation environment between the base station and the wireless communication terminals and a number of the actually allocated operating channels of white space, and performs channel negotiation with the selected base station, and wherein the management device causes at least one of the adjacent base stations to completely release an operating channel on condition that the satisfaction degree of the one base station is minimum in comparison with the satisfaction degree of the adjacent base station or the satisfaction degree of the adjacent base station is invariable while repeating the series of processes after the judgment process, and the satisfaction degree of both of them are not reversed even when the adjacent base station releases the operating channel.

13. A base station configuring a cell which includes wireless communication terminals by using a plurality of channels of a frequency of a white space, comprising:
a channel management unit which judges whether there is an exclusively-available channel which is not operated by adjacent base stations within backup channels which are determined by spectrum sensing and usable by the base station, and when there is at least one exclusively-available channel determines one exclusively-available channel as a new operating channel of the base station, and when there is not a channel which is not operated, determines a certain base station to request a release of a certain operating channel based on a comparison of satisfaction degrees between the base station and the certain base station and the satisfaction degree calculated for each of the base station and the adjacent base stations is defined as a function of communication traffic within a cell, a transmission rate depending on a propagation environment between the base station and the wireless communication terminals, and a number of actually allocated operating channels, and causes the certain base station to completely release the operating channel of white space; and
wherein the channel management unit includes:
a first judging step judges whether there is at least one channel which is neither an operating channel nor backup channel of the adjacent base stations among the backup channels of the base station;
when there is at least one channel which is neither an operating channel nor backup channel of the adjacent base stations,
a first selecting step selects the one channel of the first judging step as the new operating channel; and
when there is not at least one channel which is neither an operating channel nor backup channel of the adjacent base stations,
a second judging step judges whether the satisfaction degree of the base station is minimum among the adjacent base stations;
a third judging step judges whether there is a second cell that has a satisfaction degree that is the same as the satisfaction degree of the cell having the base station when the second judging step determines that the satisfaction degree of the base station is minimum among the adjacent base stations;

a fourth judging step judging whether the second cell has a greater number of back up channels than the cell of the base station when the third judging step determines that there is the second cell that has the satisfaction degree that is the same as the satisfaction degree of the cell having the base station; and a second selecting step selects any one of the backup channels of the base station as the new operating channel for exclusive use when the satisfaction degree of the base station has been judged minimum in the second judging step and the cell of the base station has a fewer number of the backup channels in comparison with the second cell that has the satisfaction degree that is the same as the cell having the base station as judged in the third and the fourth judging steps.

14. The base station according to claim 13, wherein the channel management unit further comprises:

a judging step judges whether the satisfaction degree of the base station is minimum compared to the adjacent base stations;

a destination selecting step selecting a most satisfied base station of which satisfaction degree after losing its any one operating channel is maximum among the adjacent base stations;

a channel selecting step selecting the certain operating channel of the most satisfied base station, which is used by least number of the adjacent base stations;

an executing step negotiating each of the certain base station using the certain operating channel to obtain the certain operating channel, wherein in the executing step, the base station and the certain base station exchange information of their satisfaction degrees with each other using a medium access control message or under control of the centralized server, and wherein in the executing step, at least one of the adjacent base stations completely releases an operating channel on condition that the satisfaction degree of the base station is minimum in comparison with the satisfaction degree of the adjacent base station or the satisfaction degree of the adjacent base station is invariable while repeating the series of processes, and the satisfaction degree of both of them are not reversed even when the adjacent base station releases the operating channel.

15. The base station according to claim 13, wherein the satisfaction degree decreases with an increase in a number of the wireless communication terminals.

* * * * *